United States Patent
Houssat et al.

(10) Patent No.: US 12,179,714 B2
(45) Date of Patent: Dec. 31, 2024

(54) DEVICE FOR CONNECTING A WIPER BLADE TO A DRIVING ARM

(71) Applicant: Valeo Systèmes d'Essuyage, Le Mesnil Saint Denis (FR)

(72) Inventors: Stéphane Houssat, Le Mesnil Saint Denis (FR); Vincent Gaucher, Le Mesnil Saint Denis (FR); Eric Poton, Le Mesnil Saint Denis (FR)

(73) Assignee: VALEO SYSTÈMES D'ESSUYAGE, Le Mesnil Saint Denis (FR)

( * ) Notice: Subject to any disclaimer, the term of this patent is extended or adjusted under 35 U.S.C. 154(b) by 0 days.

(21) Appl. No.: 17/815,748

(22) Filed: Jul. 28, 2022

(65) Prior Publication Data
US 2023/0034932 A1 Feb. 2, 2023

(30) Foreign Application Priority Data

Jul. 30, 2021 (FR) ...................................... 2108310

(51) Int. Cl.
*B60S 1/40* (2006.01)
(52) U.S. Cl.
CPC ........... *B60S 1/4003* (2013.01); *B60S 1/4038* (2013.01); *B60S 1/4048* (2013.01); *B60S 2001/4051* (2013.01); *B60S 2001/4054* (2013.01)
(58) Field of Classification Search
CPC ........ B60S 1/40; B60S 1/4003; B60S 1/4038; B60S 1/4045; B60S 1/4048; B60S 2001/4051; B60S 2001/4054
USPC ...................................................... 15/250.32
See application file for complete search history.

(56) References Cited

U.S. PATENT DOCUMENTS

| 8,707,506 | B1 | 4/2014 | Wu | |
|---|---|---|---|---|
| 2011/0247166 | A1* | 10/2011 | Depondt | B60S 1/387 15/250.32 |
| 2012/0227206 | A1 | 9/2012 | Depondt | |
| 2013/0104334 | A1* | 5/2013 | Depondt | B60S 1/4074 15/250.32 |
| 2015/0089764 | A1 | 4/2015 | Wu | |

(Continued)

FOREIGN PATENT DOCUMENTS

DE 102009029469 A1 3/2011

OTHER PUBLICATIONS

Preliminary Search Report and Written Opinion of corresponding French patent Application No. FR2108310, dated Jul. 30, 2021 (16 pages).

*Primary Examiner* — Gary K. Graham
(74) *Attorney, Agent, or Firm* — Osha Bergman Watanabe & Burton LLP

(57) ABSTRACT

The invention relates to a connection device (1) providing connection between a wiper blade and a driving arm (7) for a vehicle, comprising a base adapter (25) and at least a first adapter (26), this base adapter (25) being equipped with at least one pivot member (50) intended to connect it to a connector, the base adapter (25) being configured to connect this connector to a first type of driving arm, the base adapter (25) and the first adapter (26) each having a U-shaped cross section formed of two lateral walls (251, 261) connected by an upper wall. According to the invention, at least one lateral wall (251) of the base adapter (25) comprises at least one clearance (502) which accepts a lateral wall (261) of the first adapter (26).

14 Claims, 7 Drawing Sheets

(56) References Cited

U.S. PATENT DOCUMENTS

2015/0135465 A1     5/2015   Depondt
2021/0162956 A1*   6/2021   Hyun .................... B60S 1/4003

* cited by examiner

[Fig. 1]
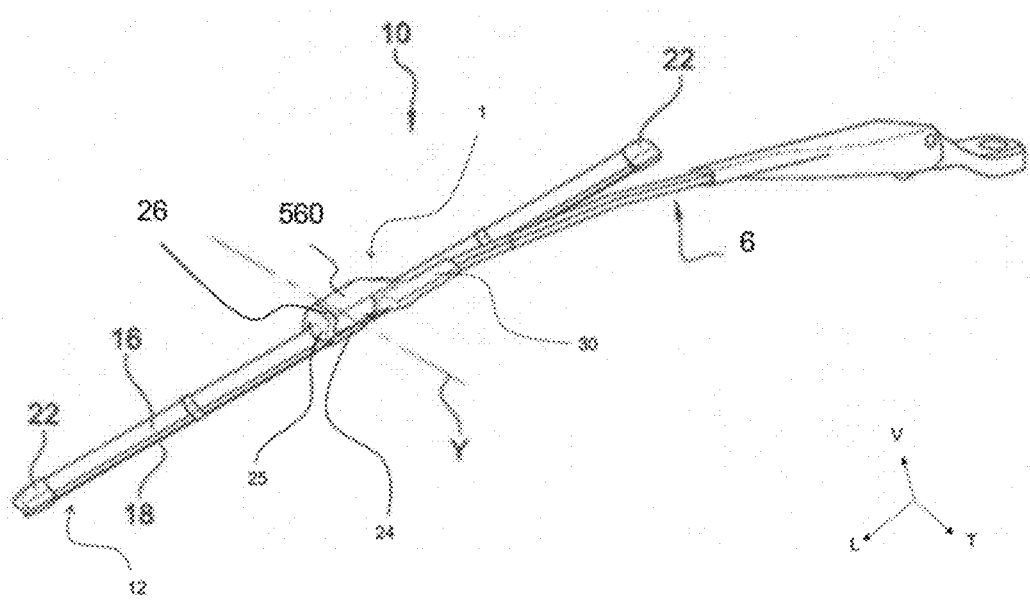

[Fig. 2]
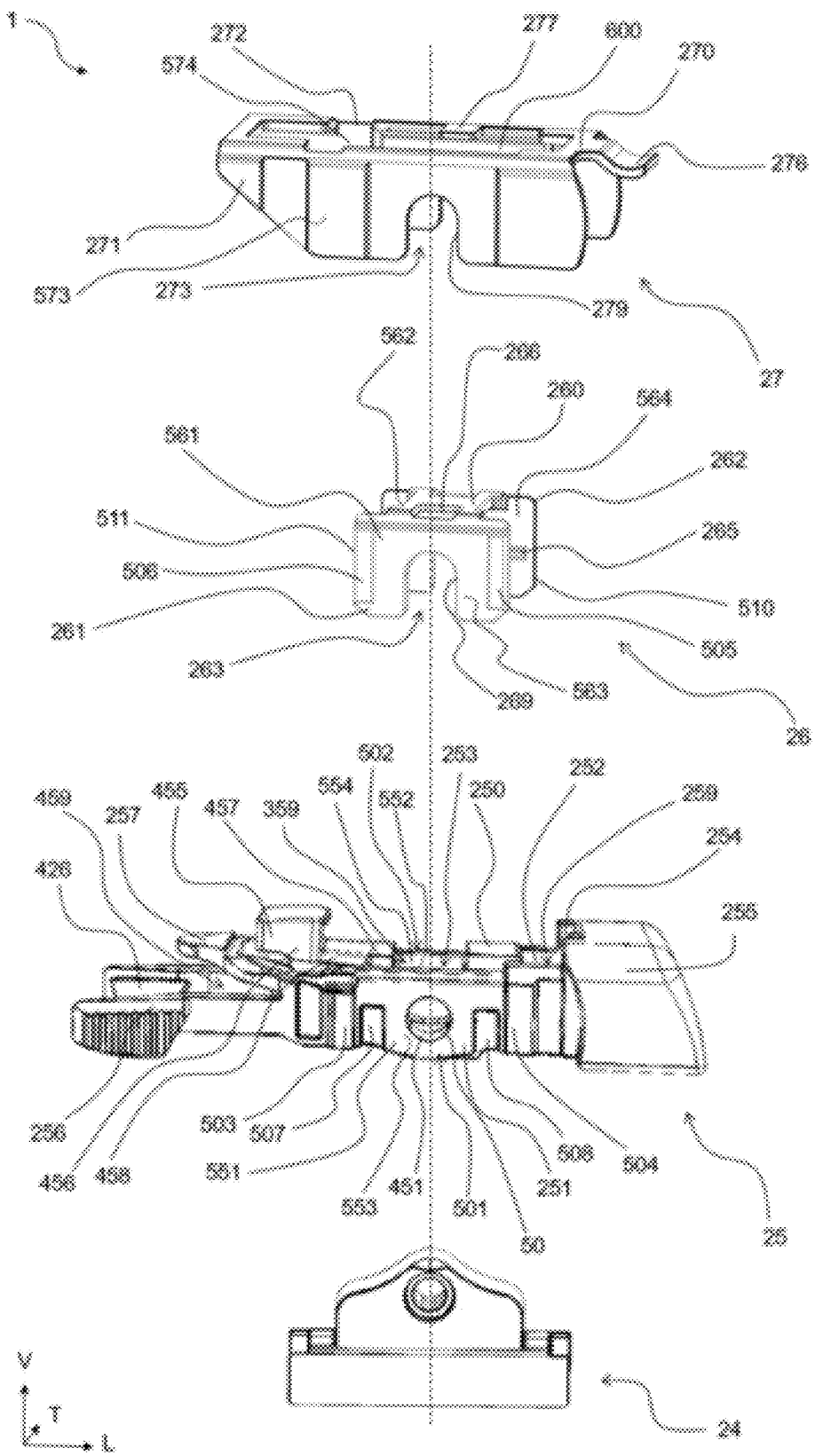

[Fig. 3]
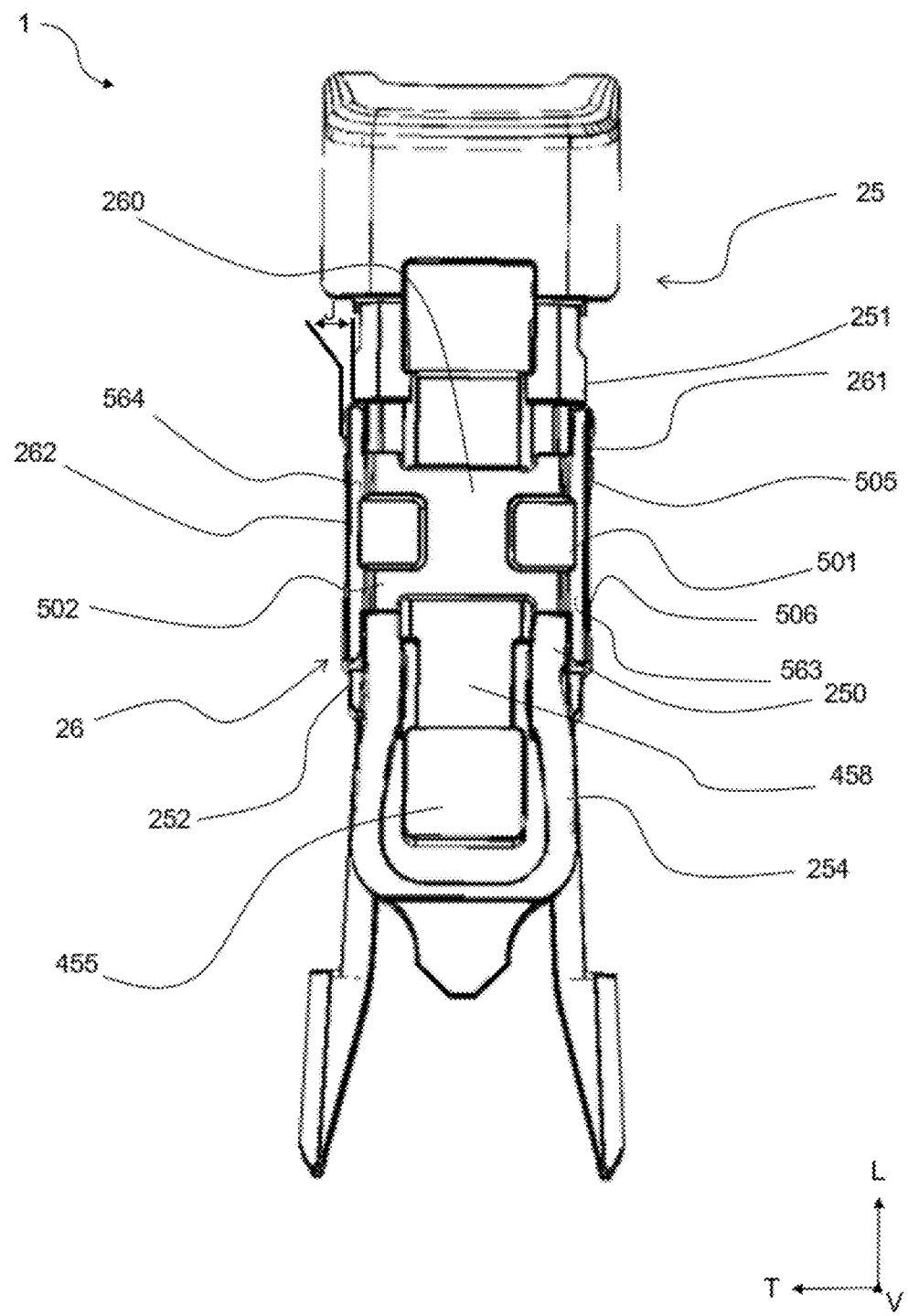

[Fig. 4]
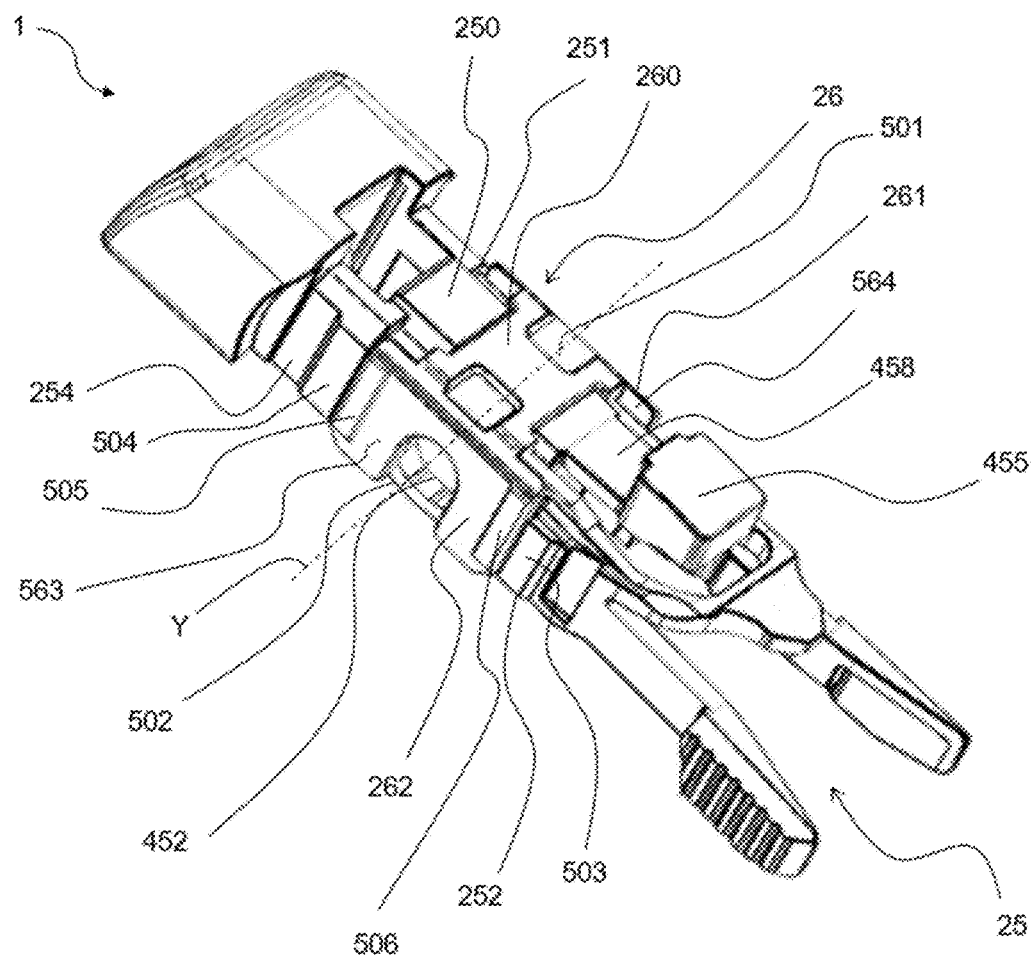

[Fig. 5]
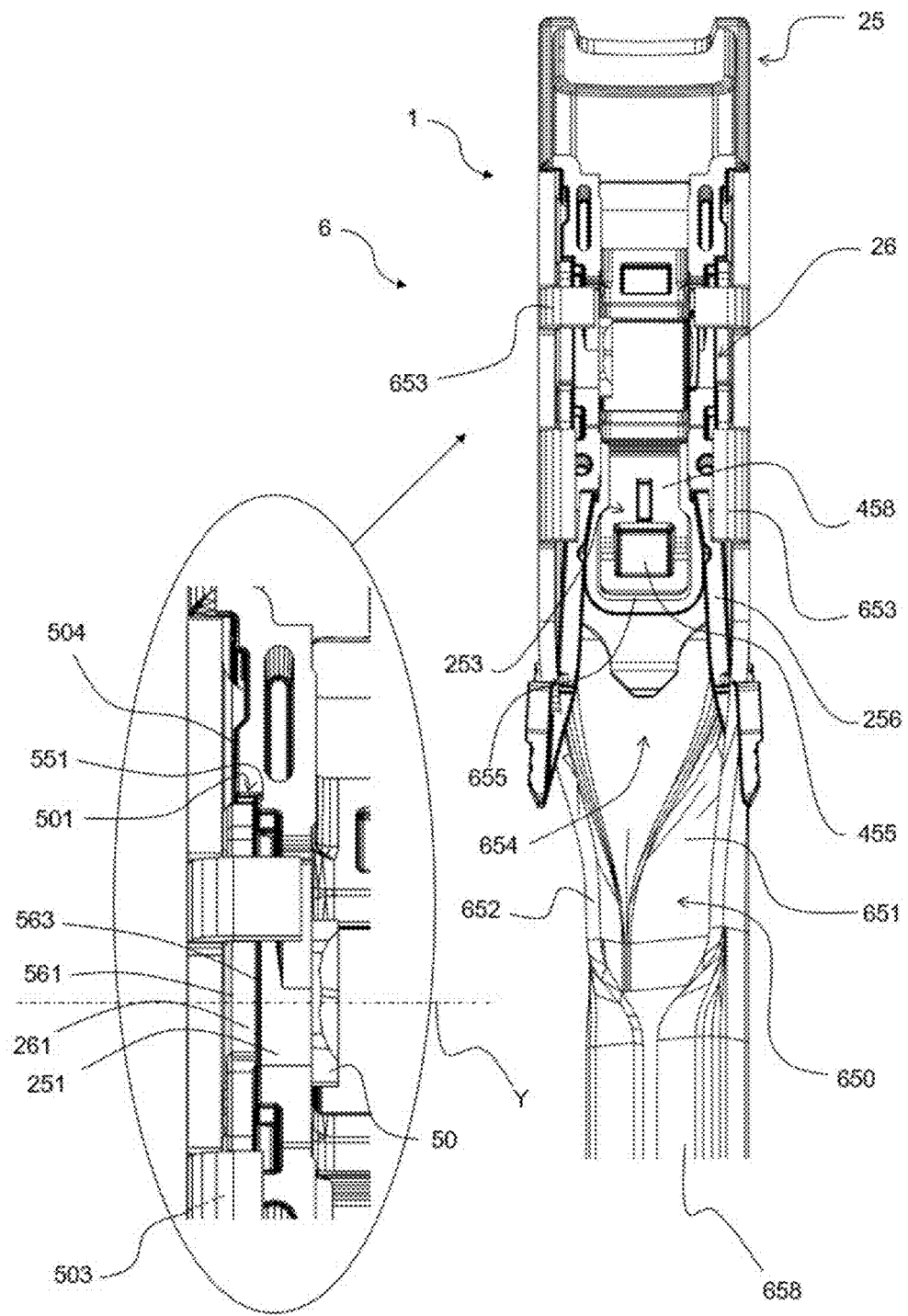

[Fig. 6]
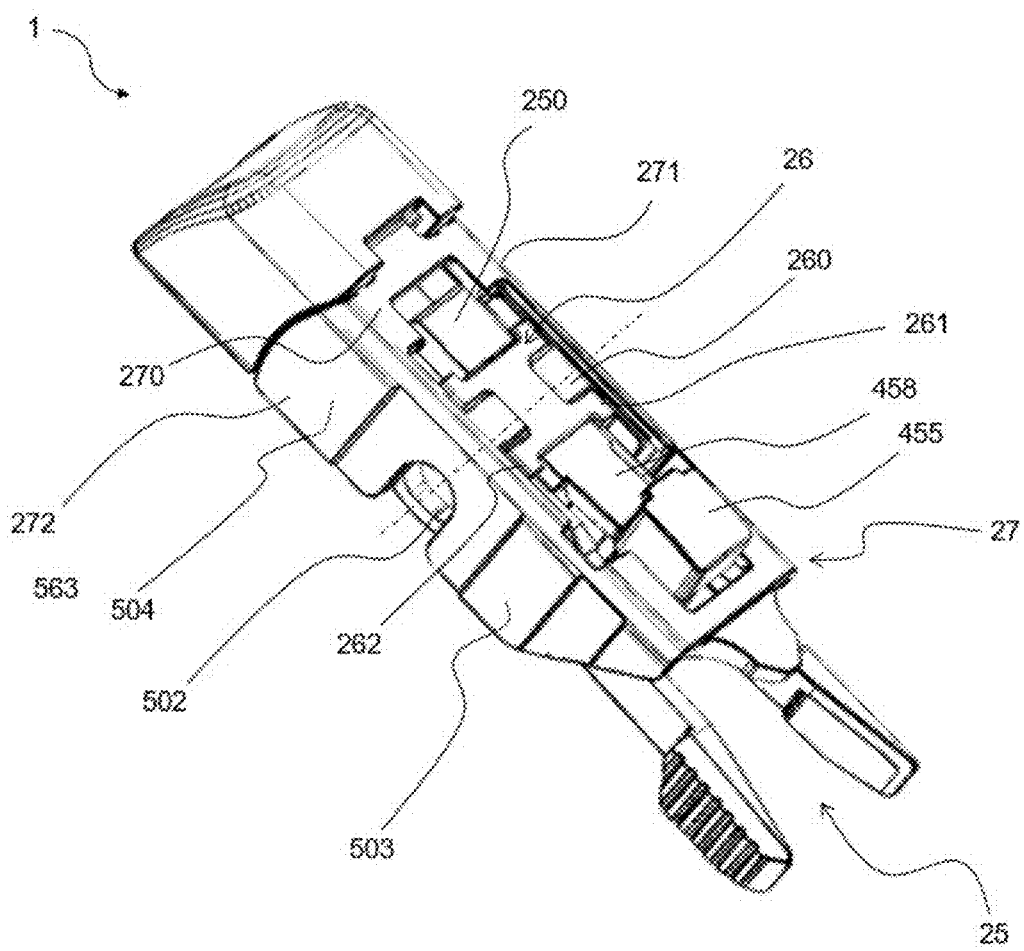

[Fig. 7]
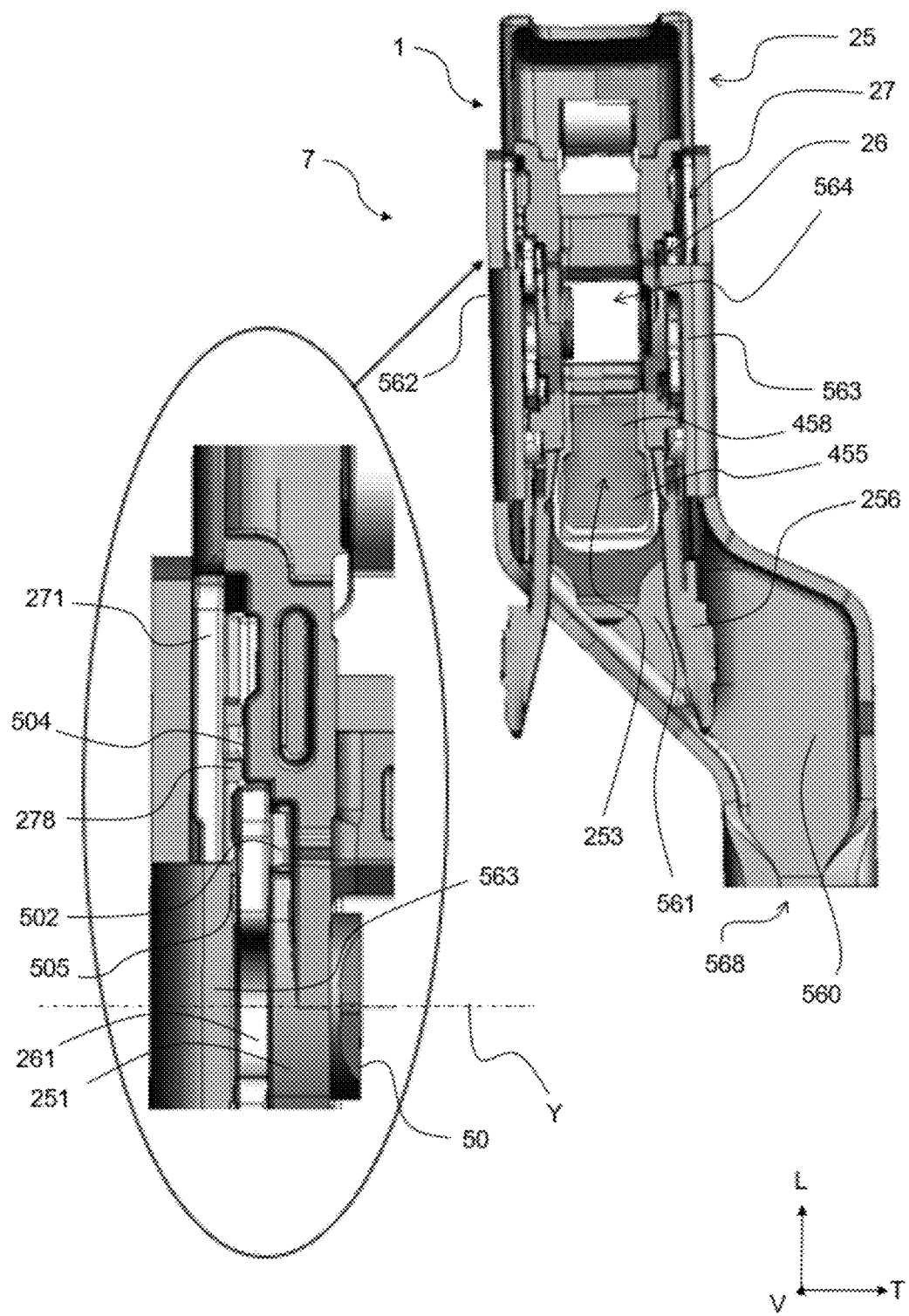

DEVICE FOR CONNECTING A WIPER BLADE TO A DRIVING ARM

The present invention relates to the field of vehicle wipers and more particularly connection devices allowing a wiper blade to be connected to a driving arm.

Wiper systems for vehicles are designed to remove liquids and dirt, which can disrupt the driver's vision, by wiping. These wiper systems generally comprise a driving arm that carries out an angular back-and-forth movement, and elongate wiper blades equipped with blade rubbers made of a resilient material. The blade rubber rubs against the windscreen and removes this liquid and dirt by sweeping it out of the driver's field of view.

The wiper blade is attached to the driving arm by a connection device which comprises a connector and an adapter. The connector is a component that is secured to the wiper blade, and which is generally secured to the blade rubber. The adapter is a component that is interposed between the driving arm and the connector, being configured to fit into a yoke belonging to the driving arm. The connector and adapter then collaborate to provide the articulated connection and to attach the wiper blade to the driving arm, thus forming the device that connects the wiper blade to the driving arm.

The articulated connection between the connector and the adapter comprises at least one transverse axis of pivoting of the connector with respect to the adapter, which is also an axis of pivoting of the wiper blade with respect to the driving arm. One of the members, for example the connector, generally comprises a substantially cylindrical shape which forms a pivot and which is received in a housing of complementary shape in the other member, in this instance the adapter.

An adapter allows a wiper blade to be combined with a particular type of yoke or driving arm, and there are numerous varieties of yoke. These varieties are similar in appearance but differ from one another in terms of their dimensions, particularly their widths or lateral dimensions. They also vary in terms of the positions of the holes designed to interact with a push-button for locking of the adapter.

Thus there are different adapters, so as to provide the ability to combine a given wiper blade with a number of yokes and, by extension, a number of driving arms.

A combination of a number of adapters may, however, lead to complications when a wiper system incorporating this combination is being used. Specifically, such a combination of the various adapters entails a clearance for fitting them together, the play resulting from this clearance potentially still existing when the adapters are mounted in the yoke of the driving arm. Because of this play, the wiper blade may, when associated with the combination of adapters and with the driving arm, oscillate detrimentally and thus impair the operation of the wiper system.

Furthermore, combining various adapters results in surplus material, which leads to a non-insignificant increase in the overall weight of the wiper system.

The present invention overcomes these technical problems by proposing a connection device that limits the play between the combination of adapters and the driving arm, by creating a clearance space free of material, which is present on a lateral wall of one of these adapters. A connection device according to the invention allows improved retention of the wiper blade, thus limiting the unwanted oscillations.

Furthermore, the present invention offers advantages associated with the packaging and use of the adapters. Because the shapes of these adapters result in a reduction in the plastics material required for manufacturing them, the bulk and so also the weight of these adapters are therefore reduced.

One subject-matter of the present invention is thus a connection device providing connection between a wiper blade and a driving arm for a vehicle, comprising a base adapter and at least a first adapter, this base adapter being equipped with at least one pivot member intended to connect it to a connector, the base adapter being configured to connect this connector to a first type of driving arm, the base adapter and the first adapter each having a U-shaped cross section formed of two lateral walls connected by an upper wall. According to the invention, at least one lateral wall of the base adapter comprises at least one clearance which accepts a lateral wall of the first adapter.

The connection device therefore comprises a base adapter and at least one complementing adapter that complements this base adapter, in this instance a first adapter.

These adapters contribute to connecting a connector to a particular type of driving arm. The adapters may connect the connector to the particular type of driving arm directly or else may involve other components, for example a second complementing adapter, in making this connection.

The adapters have U-shaped cross sections, making them easier to combine. This U-shaped cross section is formed by an upper wall, which connects two lateral walls. It is these lateral walls of the base adapter that have the clearance according to the invention, which accepts the lateral wall of the first adapter. This clearance notably makes it possible to limit the amount of play that was previously present between the connection device and the driving arm.

The base adapter comprises a pivot member connecting it to the connector, the latter providing the connection between the connection device and the wiper blade. The pivot member constitutes an articulation that allows the connector to rotate with respect to the base adapter. When the connector is secured to a wiper blade, this wiper blade can thus pivot with respect to the adapter and to the driving arm to which this adapter is connected. As a result, the wiper blade can conform to the surface of the windscreen of the vehicle to which it is fitted, so as to sweep it satisfactorily.

Advantageously, the connection device comprises two clearances, these clearances being positioned on each of the lateral walls of the base adapter, respectively.

According to one feature of the invention, the clearance is open onto an external environment of the base adapter. This external environment of the base adapter is on the opposite side to its internal housing, which corresponds to the volume defined between its upper wall and its lateral walls.

According to one feature, each lateral wall comprises bearing zones, these bearing zones being rectangular strips projecting from the external faces of the lateral walls. Each lateral wall comprises an internal face and an external face, the internal face being the one that delimits the internal housing of the adapter and the external face being the opposite face to the internal face, namely the one that faces toward the external environment of the adapter. The external faces comprise bearing zones projecting from these external faces.

According to another feature, the clearance is delimited longitudinally by the bearing zones of the base adapter. It will thus be appreciated that, in a longitudinal direction of the base adapter, which corresponds to its direction of elongation, the bearing zones contribute to delimiting the clearance. This clearance is therefore comprised between two bearing zones.

According to one feature of the invention, the bearing zones of the first adapter are positioned longitudinally at the ends thereof. These bearing zones are thus in the vicinity of the longitudinal ends of the first adapter.

According to one feature, a combination of the base adapter and the first adapter is able to be associated with a second type of driving arm that is structurally different from the first type of driving arm. The second type of driving arm is a type of driving arm that is structurally different from the first type of driving arm with which the base adapter is associated.

According to one feature, the connection device comprises a second adapter, a combination of the base adapter, the first adapter and this second adapter being able to be associated with a third type of driving arm that is structurally different from the first type and from the second type of driving arm. This third type of driving arm is a type of driving arm that is structurally different from both the first type of driving arm and the second type of driving arm. The second adapter corresponds to a second adapter that complements the base adapter. This second adapter differs from the first adapter at least in that it comprises a curved tab that becomes lodged inside a head of the base adapter.

According to one aspect of the invention, at least two adapters fit inside one another. Such interfitting is manifested in the fact that the adapters, which are substantially U-shaped components, can be nested one inside the other. One U-shaped adapter can thus cover another U-shaped adapter, which may itself cover yet another U-shaped adapter, notably the base adapter. In one embodiment, the base adapter is covered by at least one complementing adapter, notably by the first adapter, which may itself be covered by the second adapter.

Advantageously, the adapters have locking members that contribute to securing the adapters fitted inside one another. Such locking members may for example be stops or teeth, notably intended to hold the first adapter in place relative to the base adapter or else the second adapter relative to this base adapter.

According to one feature of the invention, the connection device, notably the one and/or the other of the adapters, comprises at least one stop and one locking member which are intended to secure the adapter relative to the driving arm with which it is intended to be associated. The adapter and the driving arm are thus secured to one another, the stop and the locking member preventing translational movement of the driving arm relative to the adapter. The locking member may for example be a push-button, a tongue or else legs of the adapter.

According to one feature of the invention, the locking member is positioned on an upper wall of the adapter. The locking member may thus be positioned on the upper wall of the base adapter or on the upper wall of the complementing adapter. The locking member is positioned on the upper wall notably projecting therefrom.

The invention also relates to a wiper blade comprising a connection device as described in the present document.

The invention finally relates to a wiper system comprising a driving arm bearing a wiper blade comprising a connection device, the wiper blade being connected to the driving arm by means of the connection device described hereinabove. The base adapter and the first adapter are then intended to come into contact with a yoke of the driving arm with which they are intended to be associated.

Further features, details and advantages of the invention will emerge more clearly on reading, on the one hand, the following description, and, on the other hand, an exemplary embodiment provided by way of non-limiting example with reference to the attached drawings in which:

FIG. 1 is a schematic perspective view of a wiper system in which a connection device according to the invention connects a wiper blade to a driving arm;

FIG. 2 illustrates part of a connection device in an exploded side view, with a base adapter, a first adapter, a second adapter and a connector;

FIG. 3 is a perspective view of the connection device of FIG. 1, viewed from above;

FIG. 4 is another perspective view of the connection device of FIG. 1, viewed from the side;

FIG. 5 is a perspective view, from beneath, of the connection device of FIG. 1, associated with a driving arm;

FIG. 6 is a perspective view of a connection device comprising the base adapter, the first adapter and the second adapter;

FIG. 7 is a perspective view, from beneath, of the connection device of FIG. 6, associated with a driving arm.

In the figures, elements that are common to several figures retain the same references.

In the following detailed description, the terms "longitudinal", "transverse" and "vertical" refer to the orientation of the connection device according to the invention. A longitudinal direction corresponds to a main direction of elongation of the wiper blade to which the connection device is secured, this longitudinal direction being parallel to a longitudinal axis L of a coordinate system L, V, T illustrated in the figures. A transverse direction corresponds to a direction containing the axis of rotation of the pivot member allowing pivoting between the base adapter and the connector of the connection device, this transverse direction being parallel to a transverse axis T of the coordinate system L, V, T and this transverse axis T being perpendicular to the longitudinal axis L. Finally, a vertical direction corresponds to a direction parallel to a vertical axis V of the coordinate system L, V, T, this vertical axis V being perpendicular to the longitudinal axis L and to the transverse axis T.

Furthermore, references to "lower" and "upper" with regard to the elements of the connection device mean relative to the remoteness of these elements from the wiper blade, a lower end of such elements corresponding to the end positioned in the vicinity of this wiper blade, while an upper end corresponds to the end positioned distant from the wiper blade.

FIG. 1 schematically illustrates a wiper system 10 according to the invention, comprising a wiper blade 12 and a driving arm 6 for driving the wiper blade 12. The wiper blade 12 comprises a longitudinal body 16, a blade rubber 18, generally made of rubber, and at least one vertebra (not visible) which stiffens the blade rubber 18 and encourages it to press against a vehicle windscreen.

The schematically depicted wiper blade 12 further comprises end fittings or clips 22 for attaching the blade rubber 18 and the vertebra to the longitudinal body 16, these end fittings 22 being situated at each of the longitudinal ends of the longitudinal body 16.

The wiper blade 12 bears, substantially at its middle, a connection device 1 according to the invention. This connection device 1 comprises at least two adapters. These adapters in this instance are a base adapter 25 and a complementing adapter, in this instance a first adapter 26.

The base adapter 25 and the first adapter 26 contribute to connecting a connector 24 to one particular type of driving arm, in this instance a second type of driving arm 6. The base adapter 25 and the first adapter 26 are mounted on the connector 24 in such a way as to maintain a degree of freedom to pivot about an axis of articulation Y which is a transverse axis substantially perpendicular to the longitudinal axis of the wiper blade 12. This degree of freedom allows the wiper blade 12 to pivot with respect to the driving arm 6 and thus allows the wiper blade 12 to follow the curvature of the windscreen as it moves. The base adapter 25 and the first adapter 26 may be detached from the driving arm 6, for example by pressing on an actuating button, such as a push-button, borne by the base adapter 25.

The driving arm 6 is driven by a motor, not depicted, to follow an angular back-and-forth movement that allows water and possibly other undesirable elements with which the windscreen is covered to be removed. The base adapter 25 and the first adapter 26 provide the connection between the wiper blade 12 and the driving arm 6. More specifically, they contribute to connecting a yoke 560 belonging to the driving arm 6, and which may be formed as one piece with the driving arm 6 or else may be attached and fixed to a rod thereof.

The yoke 560 has an elongate shape in an overall direction substantially parallel to the longitudinal direction of the wiper blade 12. The yoke 560 is extended at one of its longitudinal ends by a connecting part 30 for connecting to the rod of the driving arm 6.

FIG. 2 corresponds to an exploded depiction of a side view of a connection device 1 according to the invention, in this instance with a base adapter 25, a first adapter 26 and a second adapter 27, this connection device 1 being intended to be associated with the connector 24. This first adapter 26 and this second adapter 27 are complementing adapters intended to be combined with the base adapter 25.

When used alone, which is to say without a complementing adapter, the base adapter 25 can be associated with a first type of driving arm, not depicted. When combined with the first adapter 26 to form a connection device 1 according to the invention, the combination of these two adapters 25 and 26 can be associated with a second type of driving arm 6, depicted in FIGS. 1 and 5, which is structurally different from the first type of driving arm. Finally, when the base adapter 25 is associated with both a first adapter 26 and a second adapter 27, the combination of these three adapters 25, 26, 27 can be associated with a third type of driving arm 7, depicted in FIG. 7, this third type of driving arm being structurally distinguishable from the first type and from the second type of driving arm 6.

The base adapter 25 extends mainly in the longitudinal direction. This base adapter 25 has a body 254 which comprises a first lateral wall 251 and a second lateral wall 252, these walls being substantially mutually parallel and distant from one another. These walls 251, 252 are connected to one another by an upper wall 250 substantially perpendicular to them. The base adapter 25 thus has a U-shaped cross section. The walls 250, 251, 252 of this base adapter 25 have a shape that is elongated in the longitudinal direction, and between them they define an internal housing 253 intended to accommodate the connector 24. Each of the lateral walls 251 and 252 respectively comprises an external face 551 and 552 and an internal face 553 and 554. These internal faces 553 and 554 are the faces that face the internal housing 523, whereas the external faces 551 and 552 face towards an environment external to the base adapter 25.

According to the invention, at least one lateral wall 251, 252 comprises at least one clearance 501, 502. According to the embodiment depicted here, each of the lateral walls 251 and 252 comprises a clearance 501 and 502 respectively. This clearance is a recess in the lateral walls 251 and 252. Such a clearance 501, 502 faces towards the environment external to the base adapter 25; it will thus be appreciated that this clearance 501, 502 is situated on the external faces 551 and 552 of the lateral walls 251 and 252, and more particularly that it is recessed into these walls.

The lateral walls 251 and 252 furthermore each comprise two bearing zones, only the bearing zones 503 and 504 of the lateral wall 251 being visible in FIG. 2. These bearing zones 503 and 504 are rectangular strips projecting from the external faces 551 and 552 of these lateral walls 251 and 252. These bearing zones 503 and 504, which therefore extend in the direction of the external environment of the base adapter 25, are notably able to delimit the clearances 501 and 502 longitudinally. Such bearing zones 503 and 504 may be in contact with the second adapter 27 when the connection device 1 is associated with such a complementing adapter, or with the yoke 650 of a driving arm 6 when the connection device 1 does not comprise the second adapter 27.

At one of its longitudinal ends, the body 254 of the base adapter 25 is connected to a head 255, the vertical and transverse dimensions of which are greater than those of the body 254 of the base adapter 25. It will thus be appreciated that the head 255 extends beyond a longitudinal and transverse plane in which the upper wall 250 extends, and beyond a longitudinal and vertical plane in which the lateral walls 251 and 252 extend. The head 255 notably acts as a locking member. More specifically, when the wiper blade 12 is assembled with the driving arm 6 via the connection device 1 as illustrated in FIG. 1, this head 255 forms a stop for the yoke 560, thus preventing translational movement of the latter beyond the body 254 of the base adapter 25.

At another of its longitudinal ends, the upper wall 250 of the base adapter 25 narrows to a point 257 which overhangs beyond the body 255.

At this other longitudinal end, the body 254 of the base adapter 25, and more particularly the lateral walls 251, 252, are each continued in the form of an elastically deformable leg 256. These legs 256 may thus be brought closer together by elastic deformation. The legs 256 are substantially symmetrical about a plane of symmetry extending in longitudinal and vertical directions and situated equidistantly from the first lateral wall 251 and from the second lateral wall 252. Each leg 256 furthermore has a locking portion 426 configured to collaborate with cutouts in the yoke 560 so as to lock the assembly of the base adapter 25 therewith, thus constituting another locking means suited to the type of driving arm specific to the base adapter 25.

The upper wall 250 is pierced with three openings, having a first opening 259, a second opening 359 and a third opening 459 which are aligned in the longitudinal direction and provide access to the internal housing 253. The first opening 259 allows engagement of a tab with which the yoke of a driving arm may be equipped. The third opening 459, which is in the vicinity of the legs 256, is partially occupied by a tongue 458. This tongue 458 extends mainly in the longitudinal direction and has a fixed end 457 some distance from the legs 256, which is connected to the lateral wall 251 and to the lateral wall 252 by a bridge of material, and a free end 456 able to move in the vicinity of the legs 256. The tongue 458 is elastically deformable, and its free end 456 bears a push-button 455. When at rest, which is to say without constraint, the tongue 458 is positioned such that the push-button 455 is located above the plane in which the upper wall 250 extends. When the base adapter 25 is mounted in the yoke 560, the push-button 455 engages by elastic clip-fastening in a corresponding opening in the yoke 560 so as to lock the base adapter 25 with respect to this yoke.

The lateral walls 251 and 252 of the base adapter 25 are furthermore respectively equipped with a through-orifice 451 and 452 which is open onto the internal housing 253, which extends from the external faces 551 and 552 as far as the internal faces 553 and 554 of these lateral walls 251 and 252. The orifice 451 is visible in FIG. 2, whereas the orifice 52 is illustrated in FIG. 4. The orifices 451 and 452 define an axis Y of pivoting of the base adapter 25 relative to the connector 24 and, by extension, of the wiper blade 12 connected to the base adapter 25 relative to the driving arm connected to the connector 24. The base adapter 25 comprises at least one pivot member 50 mechanically connecting it to the connector 24 at its orifices 451 and 452. This pivot member 50 constitutes an articulation that allows the connector 24 to rotate with respect to the base adapter 25. Thus, when the connector 24 is secured to a wiper blade 12 as it is in FIG. 1, for example by crimping, this wiper blade 12 is able to pivot with respect to the base adapter 25 and to the driving arm to which this base adapter 25 is connected. As a result, the wiper blade 12 can, in its movements, perfectly follow the curved surface of the windscreen of the vehicle to which it is fitted.

The first adapter 26 is a component of which a transverse section is substantially U-shaped, comprising an upper wall 260 as well as a first lateral wall 261 and a second lateral wall 262. These walls 260, 261 and 262 define an internal housing 263, this internal housing 263 notably being able to accept another adapter, for example the base adapter 25. The upper wall 260 extends mainly in a transverse-longitudinal plane, whereas the lateral walls 261 and 262 extend in parallel and distinct longitudinal-vertical planes. The lateral walls 261 and 262 are thus mutually parallel and are perpendicular to the upper wall 260. Furthermore, the first adapter 26 is substantially symmetrical about a plane of symmetry extending in longitudinal and vertical directions and situated equidistantly from the first lateral wall 261 and from the second lateral wall 262.

The upper wall 260 does not extend over the entire length of the lateral walls 261 and 262; in other words, the upper wall 260 does not extend from one longitudinal end 510 to the other longitudinal end 511 of the first adapter 26. Specifically, this first adapter 26 has depressions on the upper wall 260 in the vicinity of each longitudinal end 510 and 511 of the first adapter 26. When viewed from above, the first adapter 26 is therefore H-shaped.

The lateral walls 261 and 262 have internal faces 563 and 564 which are the faces that face towards the internal housing 263. These internal faces 563 and 564, which are therefore opposite one another, bear stops 265 which project from the internal faces 563 and 564 and extend into the internal housing 263. These stops 265 are locking members which notably contribute to holding the first adapter 26 in place when it is assembled with another adapter, for example the base adapter 25, thus securing the assembly of several components. For this purpose, the stops 265 come into contact with the grooves 507 and 508 made in the external faces 551 and 552 of the lateral walls 251 and 252 of the base adapter 25, preventing vertical translational movement of the first adapter 26 with respect to the base adapter 25.

Each of the lateral walls 261 and 262 also comprises an external face 561 and 562. These external faces 561 and 562 are directed towards an environment external to the first adapter 26.

The lateral walls 261 and 262 further comprise bearing zones 505 and 506, these bearing zones 505 and 506 being rectangular strips projecting from the external faces 561 and 562 of these lateral walls 261 and 262. These bearing zones 505 and 506 therefore extend in the direction of the external environment of the first adapter 26. The bearing zones 505 and 506 of the first adapter 26 are respectively positioned in the vicinity of the longitudinal ends 510 and 511 thereof. These bearing zones are intended to come into contact with the second adapter 27 when the connection device 1 comprises such a complementing adapter, or, failing that, into contact with the yoke 650 of the second type of driving arm 6 when the connection device 1 does not comprise the second adapter 27.

The upper wall 260 has two cavities 266 that are square in shape, positioned in the vicinity of the lateral walls 261 and 262. These cavities 266 are recesses in the upper wall 260, which extend from an upper face thereof towards the internal housing 263.

Each of the lateral walls 261 and 262 has an aperture 269 which extends from a free edge of this lateral wall towards the upper wall of the first adapter 26. The aperture 269 in the lateral wall 261 is symmetrical with respect to the aperture 269 in the lateral wall 262, about the plane of symmetry. These apertures 269, which take the shape of an arc of a circle, are able to accept a shaft of a driving arm.

The second adapter 27 is also a component of which a transverse section is substantially U-shaped. The second adapter 27 comprises an upper wall 270 as well as a first lateral wall 271 and a second lateral wall 272. The upper wall 270 extends mainly in a transverse-longitudinal plane, whereas the lateral walls 271 and 272 extend mainly in parallel and distinct longitudinal-vertical planes. The lateral walls 271 and 272 are thus mutually parallel and are perpendicular to the upper wall 270. These walls 270, 271 and 272 define an internal housing 273, this internal housing notably being able to accept another adapter, in this instance the first adapter 26 described hereinabove. The faces of the lateral walls 271 and 272 that delimit this internal housing 273 correspond to the internal faces 573 and 574.

The upper wall 270 has a cutout 600 at its centre, so that this upper wall 270 constitutes merely a frame. At this central cutout 600 in the upper wall 270, the internal housing 273 communicates with the environment external to the adapter concerned. The upper wall 270 furthermore comprises a curved tab 276, which extends from one of the longitudinal ends of the second adapter 27 and away therefrom. This curved tab 276 contributes to the assembling of the second adapter 27 with other components, and notably with other adapters. This curved tab 276 may for example be received by a curved internal portion of the head 255 of the base adapter 25, such a curved internal portion not being visible in FIG. 2.

The internal faces 573 and 574, which are the faces that face towards the internal housing 273, are opposite one another and bear stops, not visible, which project from the internal faces 573 and 574 and extend into the internal housing 273. These stops notably allow the second adapter 27 to be secured to another adapter, for example the base adapter 25, preventing translational movement of this second adapter 27 in a vertical direction.

Each of the lateral walls 271 and 272 has an aperture 279 which extends from the lower end of the second adapter 27 towards the upper end thereof. The aperture 279 in the lateral wall 271 is symmetrical with respect to the aperture 279 in the lateral wall 272, about the plane of symmetry. These apertures 279, which take the shape of an arc of a circle, are able to accept a shaft of a driving arm.

One of the lateral walls 271 or 272 bears at least one protrusion 277, for example of square shape, which projects from this lateral wall 271 or 272, in the plane of the upper wall of the second adapter. This protrusion 277 consists of a continuation of material towards the other lateral wall 271 or 272, or in other words towards the lateral wall 271 or 272 from which it does not project. The protrusion 277 therefore causes the second adapter 27 to be asymmetric about a plane extending in longitudinal and vertical directions and situated equidistantly from the first lateral wall 271 and from the second lateral wall 272.

According to one aspect of the invention, at least two of these various adapters 25, 26 and 27 fit inside one another. Such interfitting is manifested in the fact that the base adapter 25, the first adapter 26 and the second adapter 27, which are substantially U-shaped components, can be nested one inside the other. One U-shaped adapter can thus cover another U-shaped adapter, which may itself cover yet another U-shaped adapter, and so on.

When the base adapter 25 and the first adapter 26 are combined to form the connection device 1 according to the invention, as visible in FIGS. 4 and 5, the first adapter 26 partially covers the base adapter 25 so that its lateral walls 261 and 262 are positioned facing the lateral walls 251 and 252 of the base adapter 25. According to the invention, the clearances 501 and 502, visible in FIG. 2, which are on the external faces 551 and 552 of these lateral walls 251 and 252 of the base adapter 25, accept the lateral walls 261 and 262 of the first adapter 26, and more particularly the internal faces 563 and 564 of these walls.

The bearing zones 503 and 504 of the base adapter 25 are recessed with respect to the bearing zones 505 and 506 of the first adapter 26; it will thus be appreciated that there is some play J between the lateral walls 251 and 252 of the base adapter 25 and the lateral walls 261 and 262 of the first adapter 26, and more particularly between the external faces 551 and 552 of the lateral walls 251 and 252 of the base adapter 25 and the internal faces 563 and 564 of the lateral walls 261 and 262 of the first adapter 26.

The upper wall 260 of the first adapter 26 covers the upper wall 250 of the base adapter 25, this first adapter 26 resting on the body 254 of the base adapter 25. Such an arrangement of the first adapter 26 leaves the tongue 458 and the push-button 455 of the base adapter 25 accessible.

When this base adapter 25 and this first adapter 26 are assembled, the connection device 1 thus formed can be associated with a second type of driving arm 6. Such an association is depicted in FIG. 5.

The driving arm 6 comprises a yoke 650 formed in the end part 658 of the second type of driving arm 6. This yoke 650 is notably made up of a longitudinal wall 651 extending in the longitudinal direction of the driving arm 6, this longitudinal wall 651 being flanked by two lateral sidewalls 652 perpendicular to it. The yoke 650 is provided with bent-over edges 653 formed at the free end of each of the lateral sidewalls 652, these bent-over edges 653 comprising a pair of short bent-over edges and a pair of long bent-over edges. These bent-over edges 653 are retaining members holding the connection device 1 within the second type of driving arm 6, preventing vertical translational movement of the base adapter 25 and of the first adapter 26.

When the connection device 1 comprising this base adapter 25 and this first adapter 26 is being associated with the second type of driving arm 6, the connection device 1 is inserted by sliding longitudinally into a receiving cavity 654 delimited in the yoke 650 by the longitudinal wall 651, the lateral sidewalls 652 and the bent-over edges 653. For this purpose, the legs 256 of the base adapter 25 are elastically deformed to bring them closer together so that they can become housed in the receiving cavity 654. In the same way, the tongue 458 and the push-button 455 of the base adapter 25 retract and are thus pushed in towards the internal housing 253 of the base adapter 25. Longitudinal translational movement of the connection device 1 is blocked when the push-button 455 enters an orifice 655 made in the longitudinal wall 651 of the yoke 650, this orifice being able to receive it. Play between the connection device 1 and the yoke 650 is thus limited, because the base adapter 25 is able to come into abutment against the yoke 650 even when this base adapter 25 is associated with the first adapter 26. The base adapter 25 and the first adapter 26 can thus both be in contact with the yoke 650, thus preventing play between the connection device 1 and the second type of driving arm 6.

When the first adapter 26 and the second adapter 27 are associated within the connection device 1, as is the case in FIGS. 6 and 7, the first adapter 26 can be housed in the internal housing 273 of the second adapter 27. The lateral walls 261 and 262 of the first adapter 26 thus face the lateral walls 271 and 272 of the second adapter 27, and more particularly the external faces 561, 562 of the lateral walls 261, 262 of the first adapter 26 face the internal faces 573 and 574 of the lateral walls 271 and 272 of the second adapter 27. The upper wall 260 of the first adapter 26 becomes housed in the central cutout 600 formed in the upper wall 270 of the second adapter 27, so that the upper wall 260 is covered by the upper wall 270 only in the region of one of the two cavities 266.

The complementing adapters that are the first adapter 26 and the second adapter 27 may be associated with the base adapter 25. When these three adapters 25, 26 and 27 are combined, the internal faces 573 and 574 of the lateral walls 271 and 272 of the second adapter 27 are pressed against the external faces 561 and 562 of the lateral walls 261 and 262 of the first adapter 26. The lateral walls 271 and 272 of the second adapter 27 also have ribs 278, visible in FIG. 7, which come to bear against the base adapter 25 in order to secure the connection device 1.

When this base adapter 25, this first adapter 26 and this second adapter 27 are fitted together, the connection device 1 can then be associated with the third type of driving arm 7.

This driving arm 7 comprises a yoke 560 formed in the end part 568 of the third type of driving arm 7. This yoke 560 is notably made up of a longitudinal wall 561 extending in the longitudinal direction of the driving arm 7, this longitudinal wall 561 being flanked by two lateral sidewalls 562 perpendicular to it. Some distance from the longitudinal wall in a vertical direction, the yoke 560 is provided with a bent-over edge 563 formed at the free end of each of the lateral sidewalls 652. This bent-over edge 563 is a retaining member holding the connection device 1 within the third type of driving arm 7, preventing vertical translational movement of the base adapter 25, of the first adapter 26 and of the second adapter 27.

When the connection device 1 comprising this base adapter 25, this first adapter 26 and this second adapter 27 is being associated with the third type of driving arm 7, the connection device 1 is inserted into a receiving cavity 564 delimited in the yoke 560 by the longitudinal wall 561, the lateral sidewalls 562 and the bent-over edge 563. For this purpose, the legs 256 of the base adapter 25 are elastically deformed to bring them closer together so that they can become housed in the receiving cavity 564. In the same way, the tongue 458 and the push-button 455 of the base adapter 25 are pushed in towards the internal housing 253 of the base adapter 25. Longitudinal translational movement of the connection device 1 is blocked when the push-button 455 emerges into an orifice, not visible, made in the longitudinal wall 561, this orifice being able to receive it.

The present invention thus offers a connection device for connecting a wiper blade and a driving arm that limits the play between a combination of adapters and the driving arm, by creating a clearance space free of material, which is situated on a lateral wall of one of these adapters. Such a connection device notably allows improved retention of the wiper blade.

However, the present invention is not limited to the means and configurations described and illustrated herein and it also extends to all equivalent means and configurations and to any technically functional combination of such means.

The invention claimed is:

1. A connection device for providing connection between a wiper blade and a driving arm for a vehicle, comprising:
   a base adapter; and
   at least a first adapter,
   the base adapter being equipped with at least one pivot member configured to connect it to a connector,
   the base adapter being configured to connect this connector to a first type of driving arm,
   the base adapter and the first adapter each having a U-shaped cross section formed of two lateral walls connected by an upper wall,
   wherein at least one lateral wall of the base adapter comprises at least one clearance which accepts a lateral wall of the first adapter,
   wherein the upper wall of the first adapter covers the upper wall of the base adapter over a through-orifice of the base adapter when the first adapter rests on a body of the base adapter,
   wherein the connection device further comprises a second adapter,
   wherein a curved tab extends from a longitudinal end of the second adapter, and
   wherein the curved tab is configured to be lodged inside a head of the base adapter.

2. The connection device according to claim 1, wherein the at least one clearance comprises two clearances, these clearances being positioned on each of the lateral walls of the base adapter, respectively.

3. The connection device according to claim 1, wherein the at least one clearance is open onto an external environment of the base adapter.

4. The connection device according to claim 1, wherein each lateral wall comprises bearing zones, these bearing zones being rectangular strips projecting from external faces of the lateral walls.

5. The connection device according to claim 4, wherein the at least one clearance is delimited longitudinally by the bearing zones of the base adapter.

6. The connection device according to claim 4, wherein the bearing zones of the first adapter are positioned longitudinally at ends thereof.

7. The connection device according to claim 1, wherein a combination of the base adapter and the first adapter is able to be associated with a second type of driving arm that is structurally different from the first type of driving arm.

8. The connection device according to claim 1, wherein the adapters have locking members that contribute to securing the adapters fitted inside one another.

9. A wiper blade comprising the connection device according to claim 1.

10. A wiper system comprising a driving arm bearing the wiper blade according to claim 9, the wiper blade being connected to the driving arm by the connection device.

11. A connection device providing connection between a wiper blade and a driving arm for a vehicle, comprising:
    a base adapter; and
    at least a first adapter,
    the base adapter being equipped with at least one pivot member configured to connect it to a connector,
    the base adapter being configured to connect this connector to a first type of driving arm,
    the base adapter and the first adapter each having a U-shaped cross section formed of two lateral walls connected by an upper wall,
    wherein at least one lateral wall of the base adapter comprises at least one clearance which accepts a lateral wall of the first adapter,
    wherein the connection device further comprises a second adapter,
    wherein a curved tab extends from a longitudinal end of the second adapter,
    wherein the curved tab is configured to be lodged inside a head of the base adapter,
    wherein a combination of the base adapter, the first adapter, and the second adapter are associated with a third type of driving arm that is structurally different from the first type and from a second type of driving arm,
    wherein the first adapter fits inside the second adapter,
    wherein the upper wall of the first adapter covers the upper wall of the base adapter over a through-orifice of the base adapter when the first adapter rests on a body of the base adapter.

12. A connection device providing connection between a wiper blade and a driving arm for a vehicle, comprising:
    a base adapter; and
    at least a first adapter,
    the base adapter being equipped with at least one pivot member configured to connect it to a connector,
    the base adapter being configured to connect this connector to a first type of driving arm,
    the base adapter and the first adapter each having a U-shaped cross section formed of two lateral walls connected by an upper wall,
    wherein at least one lateral wall of the base adapter comprises at least one clearance which accepts a lateral wall of the first adapter,
    wherein the connection device further comprises a second adapter,
    wherein a curved tab extends from a longitudinal end of the second adapter,
    wherein the curved tab is configured to be lodged inside a head of the base adapter,
    wherein a combination of the base adapter, the first adapter, and the second adapter are associated with a third type of driving arm that is structurally different from the first type and from a second type of driving arm,
    wherein the first adapter fits inside the second adapter,
    wherein the lateral walls of the first adapter have internal faces, which face towards an internal housing of the first adapter, wherein the internal faces, which are opposite one another, bear stops of the first adapter, which project from the internal faces and extend into the internal housing, and wherein the stops are locking members, which contribute to holding the first adapter in place when it is assembled with the base adapter, and securing the assembly of the first adapter with the base adapter.

13. A connection device providing connection between a wiper blade and a driving arm for a vehicle, comprising:

a base adapter; and at least a first adapter, the base adapter being equipped with at least one pivot member configured to connect it to a connector, the base adapter being configured to connect this connector to a first type of driving arm, the base adapter and the first adapter each having a U-shaped cross section formed of two lateral walls connected by an upper wall, wherein at least one lateral wall of the base adapter comprises at least one clearance which accepts a lateral wall of the first adapter, wherein the connection device further comprises a second adapter, wherein a curved tab extends from a longitudinal end of the second adapter, wherein the curved tab is configured to be lodged inside a head of the base adapter, wherein a combination of the base adapter, the first adapter, and the second adapter are associated with a third type of driving arm that is structurally different from the first type and from a second type of driving arm, wherein the first adapter fits inside the second adapter, wherein the lateral walls of the first adapter comprise bearing zones, wherein the bearing zones project from external faces of the lateral walls of the first adapter, and wherein the bearing zones extend in a direction of an external environment of the first adapter.

14. A connection device providing connection between a wiper blade and a driving arm for a vehicle, comprising:

a base adapter; and at least a first adapter, the base adapter being equipped with at least one pivot member configured to connect it to a connector, the base adapter being configured to connect this connector to a first type of driving arm, the base adapter and the first adapter each having a U-shaped cross section formed of two lateral walls connected by an upper wall, wherein at least one lateral wall of the base adapter comprises at least one clearance which accepts a lateral wall of the first adapter, wherein the connection device further comprises a second adapter, wherein a curved tab extends from a longitudinal end of the second adapter, wherein the curved tab is configured to be lodged inside a head of the base adapter, wherein a combination of the base adapter, the first adapter, and the second adapter are associated with a third type of driving arm that is structurally different from the first type and from a second type of driving arm, wherein the first adapter fits inside the second adapter, wherein the upper wall of the first adapter has at least one cavity disposed in a vicinity of the lateral walls of the first adapter, and wherein the cavity is a recess in the upper wall of the first adapter, which extends from an upper face thereof towards an internal housing of the first adapter.

\* \* \* \* \*